Aug. 12, 1952   C. B. RICHEY   2,606,417
REVERSIBLE IMPLEMENT AND COUPLING THEREFOR
Filed Jan. 3, 1948   5 Sheets-Sheet 1

INVENTOR.
CLARENCE B. RICHEY
BY Carlson, Pitzner,
Hubbard & Wolfe
ATTORNEYS Aug. 12, 1952 C. B. RICHEY 2,606,417
REVERSIBLE IMPLEMENT AND COUPLING THEREFOR
Filed Jan. 3, 1948 5 Sheets-Sheet 2

INVENTOR.
CLARENCE B. RICHEY
BY Carlson, Pitzner,
Hubbard & Wolfe
ATTORNEYS

Aug. 12, 1952 — C. B. RICHEY — 2,606,417
REVERSIBLE IMPLEMENT AND COUPLING THEREFOR
Filed Jan. 3, 1948 — 5 Sheets-Sheet 3

INVENTOR.
CLARENCE B. RICHEY
BY
Carlson, Pitzner, Hubbard & Wolfe
ATTORNEYS

Aug. 12, 1952  C. B. RICHEY  2,606,417
REVERSIBLE IMPLEMENT AND COUPLING THEREFOR
Filed Jan. 3, 1948  5 Sheets-Sheet 4

Fig.10

INVENTOR.
CLARENCE B. RICHEY
BY
ATTORNEYS

Aug. 12, 1952         C. B. RICHEY         2,606,417
REVERSIBLE IMPLEMENT AND COUPLING THEREFOR
Filed Jan. 3, 1948         5 Sheets-Sheet 5

INVENTOR.
CLARENCE B. RICHEY
BY
Carlson, Pitzner, Hubbard & Wolfe
ATTORNEYS

Patented Aug. 12, 1952

2,606,417

UNITED STATES PATENT OFFICE 2,606,417

REVERSIBLE IMPLEMENT AND COUPLING THEREFOR

Clarence B. Richey, Royal Oak, Mich., assignor to Harry Ferguson, Inc., Detroit, Mich., a corporation of Delaware Application January 3, 1948, Serial No. 469

18 Claims. (Cl. 56—27)

1

The present invention pertains generally to tractor-propelled agricultural implements and more specifically to a reversible implement of particular but by no means exclusive utility in connection with a tractor having a hitch linkage trailingly supported on its rearward end.

One of the objects of the invention is to provide an implement of the type set forth and which can be detachably connected to a tractor for actuation in a leading, trailing, or intermediate angular position with respect to the latter, and with accommodation for pitching and rolling movements relative to the tractor in any such position.

Another object is to provide an implement of the above type which can be immediately shifted from one of the foregoing positions to the other without unhitching the implement from the tractor and without interfering with the free steering movement of the latter.

More specifically, it is an object of the present invention to provide a reversible, ground-supported buck rake having the above characteristics, together with novel means for transporting and unloading the same.

Another object is to provide a buck rake of the foregoing type and having a novel arrangement of power transmitting means controllable from the tractor for use in conjunction with the rake assembly and its component elements.

Further objects and advantages will become apparent as the following description proceeds, taken in connection with the accompanying drawings, in which.

2

While the invention is susceptible of various modifications and alternative constructions, certain preferred embodiments have been shown in the drawings and will be herein described in some detail, but it is to be understood that there is no intentention to limit the invention to the specific forms disclosed, the intention being, on the contrary, to cover all modifications and alternative constructions falling within the spirit and scope of the invention as expressed in the appended claims.

Figure 1:
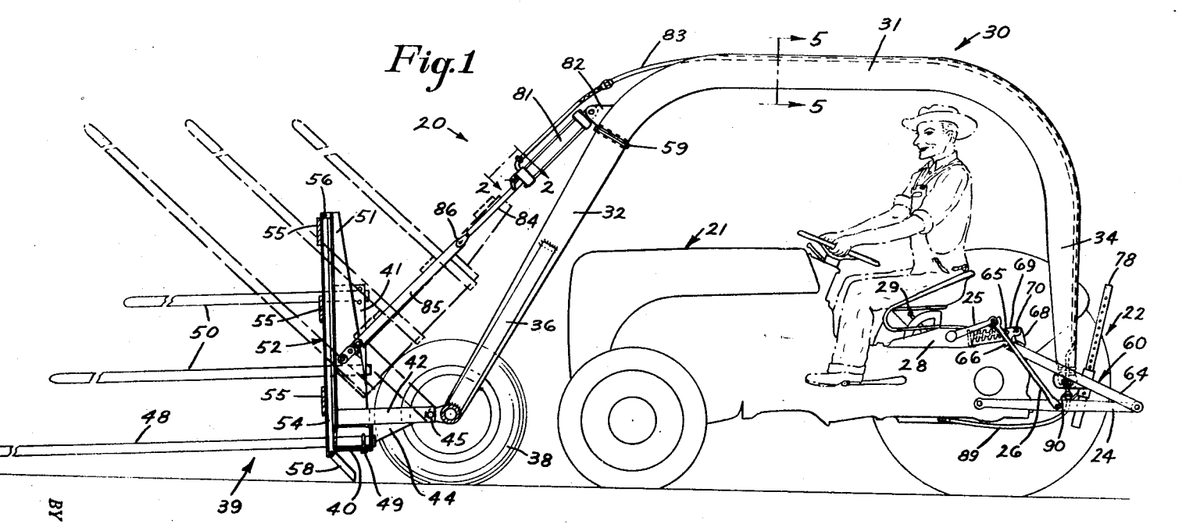
Figure 1 is an off-center, vertical sectional view taken longitudinally through an implement embodying the invention and showing in elevation the frame thereof and the tractor hitch linkage.
Figure 2:
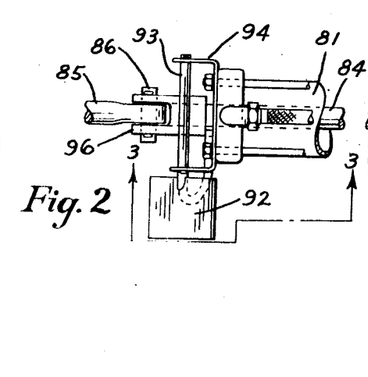
Fig. 2 is an enlarged fragmentary detail view of the indicating mechanism attached to the hydraulic actuator of the rake assembly, taken with the plane of the line 2—2 as a reference.
Figure 3:
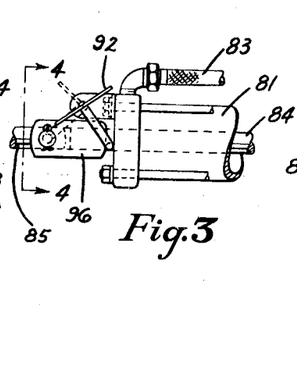
Fig. 3 is an enlarged fragmentary detail side view of the device of Fig. 2, with the plane of the line 3—3 as a reference.
Figure 4:
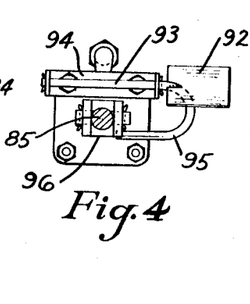
Fig. 4 is an enlarged fragmentary detail end view of the device of Fig. 2, taken from the plane of the line 4—4.

In Figure 1 an exemplary implement in the form of a buck rake 20 is shown coupled to a well known type of light tractor 21 by means of a hitch linkage 22 trailingly supported on the rearward end portion thereof. Operatively connected to a pair of rearwardly extending draft links 24 of the hitch linkage, as by means of crank arms 25 and drop links 26, is a hydraulic power lift 28 which is manually controllable through a quadrant lever 29 mounted on the tractor.

Figures 6, 6A, 9:
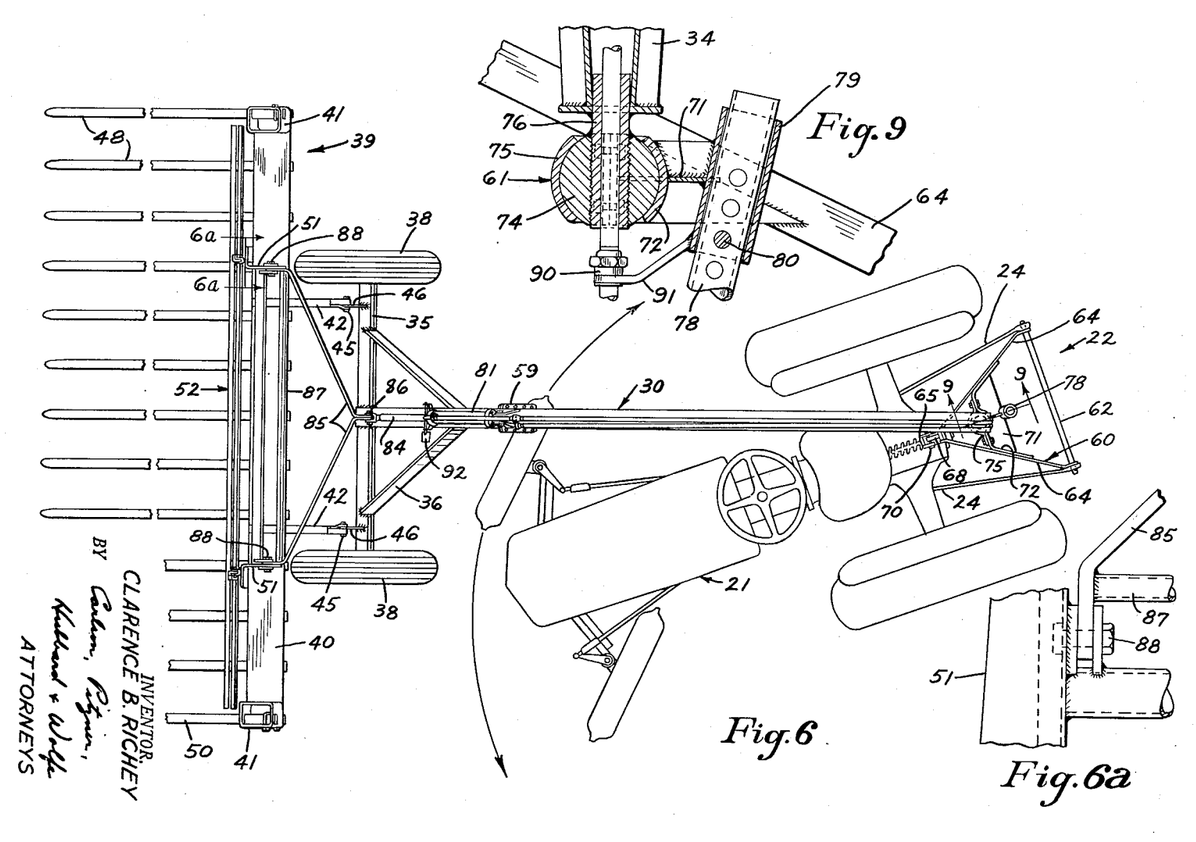
Fig. 6 is a plan view of the implement shown in Fig. 1, the clearance between the turning circle of the tractor and the ground wheels of the implement being clearly indicated.
Fig. 6a is an enlarged fragmentary detail view of one of the pivotal connections between the rake actuating yoke and a vertical brace unitary with the rake assembly, the view being taken in the plane of the line 6a—6a of Fig. 6.
Fig. 9 is an enlarged fragmentary detail sectional view through the swivel coupling and ground-engaging standard of the implement of Fig. 6, taken in the plane of line 9—9.

Turning more particularly to Fig. 1 and also to Fig. 6, it will be observed that the implement 20 is constructed upon a main frame 30 having a longitudinally extending central portion 31, the ends of which terminate in a pair of spaced-apart, depending legs 32, 34. Rigidly secured to the leg 32 adjacent the lower extremity thereof is a laterally extending transverse frame member 35 suitably reinforced by means of a pair of stays 36 running diagonally between the leg 32 and the member 35. Directly associated with the latter is ground supporting means for the implement, such means comprising in the present instance a pair of ground wheels 38 journaled on stub axles (not shown in detail) carried by the member 35.

Pivotally mounted on the wheeled end of the main frame 30 for fore and aft rocking movement between a working position close to the ground and a raised carrying position is a rake assembly 39. As indicated in Figs. 1 and 6, this assembly comprises a laterally extending rake beam 40 of hollow rectangular cross-section and having at its ends a pair of upstanding side beams 41 of similar cross-section but shorter length. The beam 40 is arranged in substantial parallelism with the transverse frame member 35, such being accomplished by means of a pair of spaced-apart mounting arms 42 rigidly attached to the beam 40 at intermediate points thereon and reinforced by gusset plates 44. The free ends of the arms 42 are pivotally connected, as at 45, to a pair of correspondingly spaced brackets 46 unitary with the transverse frame member 35. Spaced at approximately equal intervals along the length of the beam 40 are a series of alined pairs of holes through the sides thereof for receiving a corresponding series of longitudinally projecting rake tines or prongs 48. The root ends of the latter may be locked firmly within the beam 40 as by pins 49. Each of the side beams 41 is likewise provided with holes for receiving respective pairs of side arms 50 which are similar but somewhat shorter than the tines 48 and in addition each pair is of unequal length with respect to the other.

Rising in spaced-apart relationship from the rake beam 40 are a pair of buttress-like vertical braces 51 which serve as the principal thrust resisting means for a transversely mounted rake back 52. The latter comprises a relatively light grid formed by vertical structural members 54 which are connected by a plurality of vertically spaced slats 55. Adjacent their upper ends, the structural members 54 are swingably suspended from the vertical braces 51 as by pins 56. In the vicinity of their lower ends, the members 54 are provided with depending ground-engaging feet 58 adapted, when the rake assembly is in a lowered position and the implement is backed in a direction away from such assembly, to bite into the ground and swing the rake back longitudinally of the tines 48. This action can be of considerable assistance when the rake is being unloaded.

Figure 5:
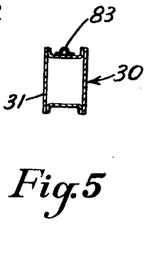
Fig. 5 is a slightly enlarged transverse sectional view through the main frame of the implement and taken in the plane of the line 5—5.

Provision is made for operating the implement 20 in a leading position relative to the tractor and without interfering in any way with the free steering movements of the latter. This is accomplished in the present instance by forming the main frame 30 in the shape of an inverted U with the generally horizontal central portion 31 curving downwardly toward its ends to define the longitudinally spaced legs 32, 34. Stated another way, the main frame is given an arch-like profile with a span greater than the distance from the hitch point to the forward extremity of the tractor, such distance in many tractors being about the length of the tractor frame. The arch-like frame 30 is of sufficient height to permit a tractor with an operator in driving position thereon to pass freely thereunder. With regard to the cross-sectional shape of the frame 30, any appropriate structure commensurate with the stresses involved may be utilized. In the illustrative implement, it has been found convenient to employ a type of box girder construction, a section of which is shown in Fig. 5. From the standpoint of assembly and shipping, some advantages may be derived by fabricating the frame in one or more separate lengths, bolting them together as at 59.

Means is provided for detachably coupling the implement 20 to the rearward end portion of the tractor with such implement readily reversible between a working position in leading relation to the tractor and a transport position in trailing relation to the latter and with accommodation for pitching and lateral rolling movements of the implement due to irregularities in ground contour. This is accomplished in the present instance by the use of an attaching frame 60 associated with the tractor draft links 24 and serving as a carrier for a universal swivel coupling 61, the same being freely rotatable about an upright axis through an angle of at least 360 degrees. The frame 60 comprises a transverse bar 62 comparable in size to the well known tractor draw bar, together with a pair of forwardly converging stay struts 64 running from the ends of the bar 62 to a shackle or bell crank 65 which is a part of the tractor power lift. The forward ends of the struts 64 are concave in shape and abut snugly against a downwardly projecting arm 66 of the bell crank. Unitary with the forward ends of the struts 64 is an upstanding bracket 68 adapted for connection to another arm 69 of the bell crank as by means of a pin 70. With the forward ends of the struts connected as described and the ends of the transverse bar 62 attached to the trailing ends of the draft links 24, it will be appreciated that a rigid truss-like structure is created, precluding vertical swinging movement in the tractor hitch linkage.

Running transversely of the struts 64 and mounted at a point intermediate their length is a stiffening plate 71 which serves as a mounting for the swivel coupling 61 (refer to Fig. 9). Rigidly attached to the struts and to the sides and forward edge of the plate 71 is a strap 72 having a centrally located curved offset which is also laterally convex for receiving a swivel ball 74. A short strap 75 having a shape generally similar to that of the central portion of the strap 72 is adapted to engage the ball 74, the latter being locked between the straps when the same are bolted together. The ball 74, while permitted to swivel in any direction within the arcuate pocket formed between the straps 72, 75, is firmly secured to the depending end of the main frame leg 34 as by means of a short rigid tube 76.

By the use of the foregoing arrangement, the implement 20 is rendered immediately reversible from the working position ahead of the tractor to the transport position rearward of the latter, or vice versa as the case may be, with full accommodation for pitch and lateral roll relative to the tractor in either of such positions or in any intermediate position. Furthermore, the shift may be performed by a single tractor operator without dismounting from his machine and, in fact, without doing anything more complicated than driving the tractor either under or out from under the main frame 30. The feature of reversibility is particularly advantageous in connection with a buck rake because it enables an operator to load in a field with the rake in front and immediately shift the implement to the transport position. This improves his visibility and increases the maneuverability of the tractor, thus permitting a trip to the stacking or loading point with a minimum loss of time.

For the purpose of supporting the coupled end of the implement 20 when the latter is in an unhitched condition, an adjustable ground-engaging standard 78 is associated with the attaching frame 60. Thus there is mounted on the rearward edge of the plate 71 a relatively short, upright sleeve 79 having a series of axially spaced, diametrically opposed holes in its side walls. The standard 78 is slidably housed within the sleeve and is also provided with a similar series of holes, being lockable at any one of a number of axial positions by means of a transverse pin 80.

Provision is made in the form of power transmitting means for applying rocking force to the rake assembly 39 so as to move the same between the lower or working position indicated by full lines in Fig. 1 and the upper or raised carrying position indicated by broken lines in the same figure. Preferably, such means comprises a hydraulic actuator 81 operatively connected between the main frame 30 and the rake assembly 39 and responsive to the manual control lever 29 of the tractor power lift. In the present instance, the actuator 81 is swingably attached to a projecting lug 82 on the main frame 30, receiving pressure fluid at its lower end from the main hydraulic system of the tractor via a conduit 83. The actuator includes a piston (not shown) and a reciprocable piston rod 84 which is pivotally connected to a rake actuating yoke 85 as by a pin 86. The lower ends of the yoke 85 are spanned by a tie rod 87 and, as indicated in Fig. 6a, are bolted or pinned at 88 to the vertical braces 51 rigidly mounted on the rake beam 40.

Referring more particularly to Figs. 1, 6, and 9, hydraulic pressure fluid from the supply conduit of the tractor power lift 28 may be dispatched to the actuator 81 via a jumper conduit 89 which communicates with the conduit 83 through a swivel union 90 mounted below the main swivel coupling 61 and in axial alinement therewith. A supporting finger 91 carried by the sleeve 79 serves to keep the union 90 properly oriented. Due to the positive locking against vertical swinging movement of the tractor hitch linkage 22 and the power lift 28 by the attaching frame 60, the setting of the manual control or quadrant lever 29 on the tractor is directly effective to control the application of pressure fluid to the actuator 81. A setting of the lever 29 which will cause pressure fluid to enter the actuator 81 will result in the application of lifting force to the under side of the actuator piston. This produces retraction of the piston rod 84 and consequent raising of the rake assembly 39. Conversely, when the rake assembly is raised, release of the pressure fluid from the actuator will result in lowering the assembly.

With the arrangement described, the continued application of pressure fluid to the actuator 81 after the piston thereof has reached the end of its upward stroke will impose an overload on the hydraulic system of the power lift 28. This will cause the overload release valve, or its equivalent in the system, to bleed off pressure. While some sort of overload protection is necessary in such a system, it is undesirable that it function during the course of a normal operating cycle. This problem is conveniently solved by the use of visual indicating means associated with the actuator 81 to apprise the operator of the fact that the piston thereof is approaching the upper end of its stroke and that the supply of pressure fluid to the actuator should be cut off. Turning now to Figs. 1 to 4, it will be noted that the indicating means comprises a rotatable flag 92 in the form of a small metal plate which normally lies inconspicuously in a horizontal plane and virtually out of sight of the tractor operator. The flag 92 is unitary with a U-shaped rod, the upper leg 93 of which is journaled in a bracket 94 bolted to the lower end of the actuator 81. The lower leg 95 of the U-shaped rod projects into the path of a clevis 96 which is unitary with the piston rod 84 of the actuator, thus making the device responsive to relative motion between the piston rod and the body of the actuator. The relationship of the parts is such that the indicating flag 92 will remain substantially horizontal throughout the major portion of the stroke of the actuator piston, the upper end of the clevis 96 coming into abutment with the leg 95 as the last and most critical portion of the stroke is traveled. As abutment occurs between the leg 95 and the clevis, the flag 92 is progressively tilted from a horizontal to a steeply inclined plane where it becomes readily visible to the operator.

Figure 7:
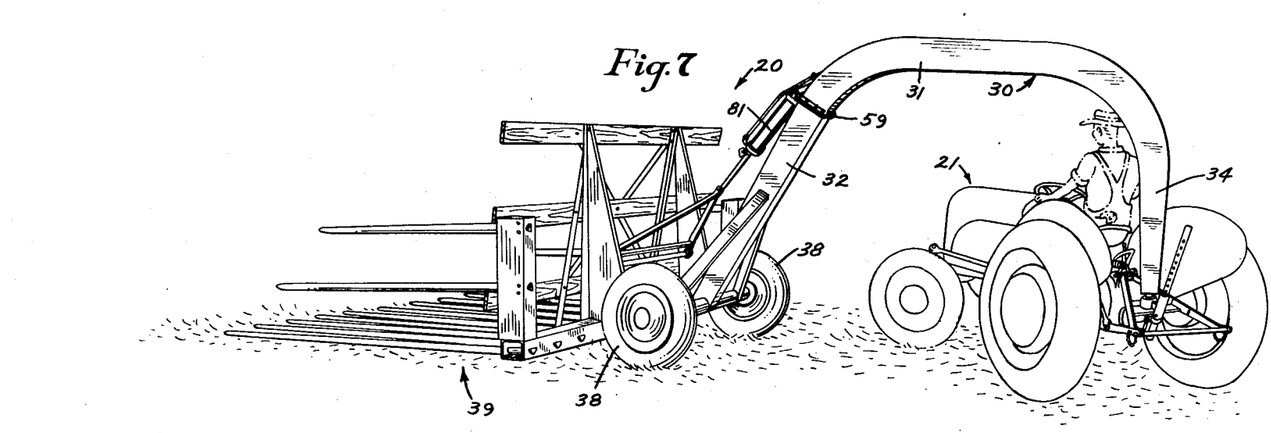
Figs. 7 and 8 are perspective views of the implement shown in Fig. 1, illustrating its relationship to the tractor in the leading and the trailing positions.
Figure 8:
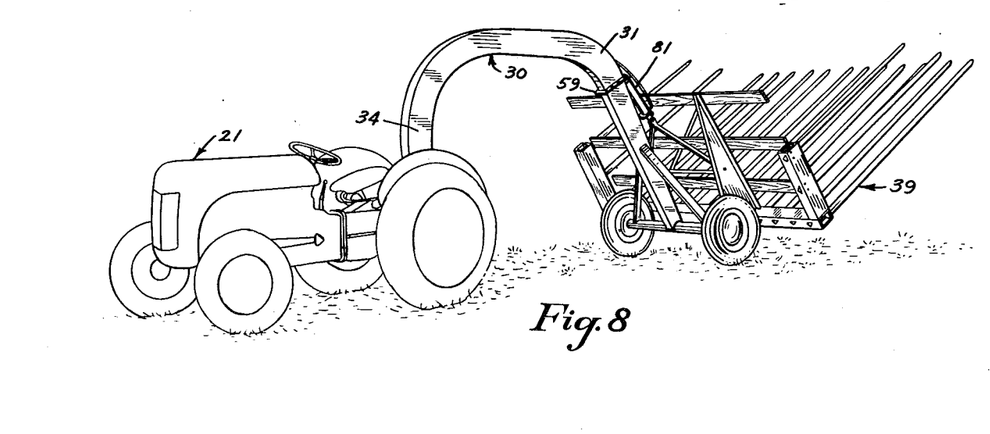

A brief synopsis of the operation of the implement as thus far described might be appropriate at this point. Assume, for example, that the buck rake 20 has been hitched to the tractor 21 and that the operator desires to rake up a load of hay. With the rake assembly 39 in the lowered or working position shown in Figs. 1 and 7, the operator merely turns his tractor until the latter travels along approximately the same path as the implement which precedes it. By the simple expedient of steering the tractor to one side or the other it is possible to direct the implement along any desired path. By turning the tractor a little more sharply than normally necessary on a straightaway, the implement may readily be negotiated around any turn which might have to be made. The fact that the only connection between the implement and the tractor is overhead and to the rear makes it possible to obtain instant response from the rake as the tractor is turned and precludes interference with the normal steering or control of the latter. When a load of hay or material of like nature has been accumulated in the rake assembly, the operator has means at his disposal for speedily and efficiently transferring the same to a hay stack without assistance and with little danger of losing any significant quantity of hay. Thus when the rake becomes loaded, the first step is to raise the rake assembly, which may be readily done by shifting the hydraulic control lever 29 on the tractor to pressure applying position. As the rake nears the upper limit of its travel, the indicating flag 92 becomes visible, informing the operator that the supply of pressure fluid to the actuator should be cut off. In order to reverse the orientation of the implement 20 from the working or leading position to the transport or trailing position, the operator has merely to cramp the front wheels of the tractor to either side and simply drives it out from under the main frame 30. By such a move, the implement 20 can be brought into alinement with the longitudinal axis of the tractor rearwardly thereof, whereupon the implement and load may be transported with ease at high speed and with other advantages inherent in trailingly connected implements. At the stack or other place of deposit, the relative positions of the tractor and implement may again be reversed in the manner described. The rake assembly 39 is then lowered until the feet 58 of the rake back engage the ground, whereupon the tractor and implement are suddenly backed away from the load which is given a parting shove by the rake back as it swings relative to the implement.

Figure 10:
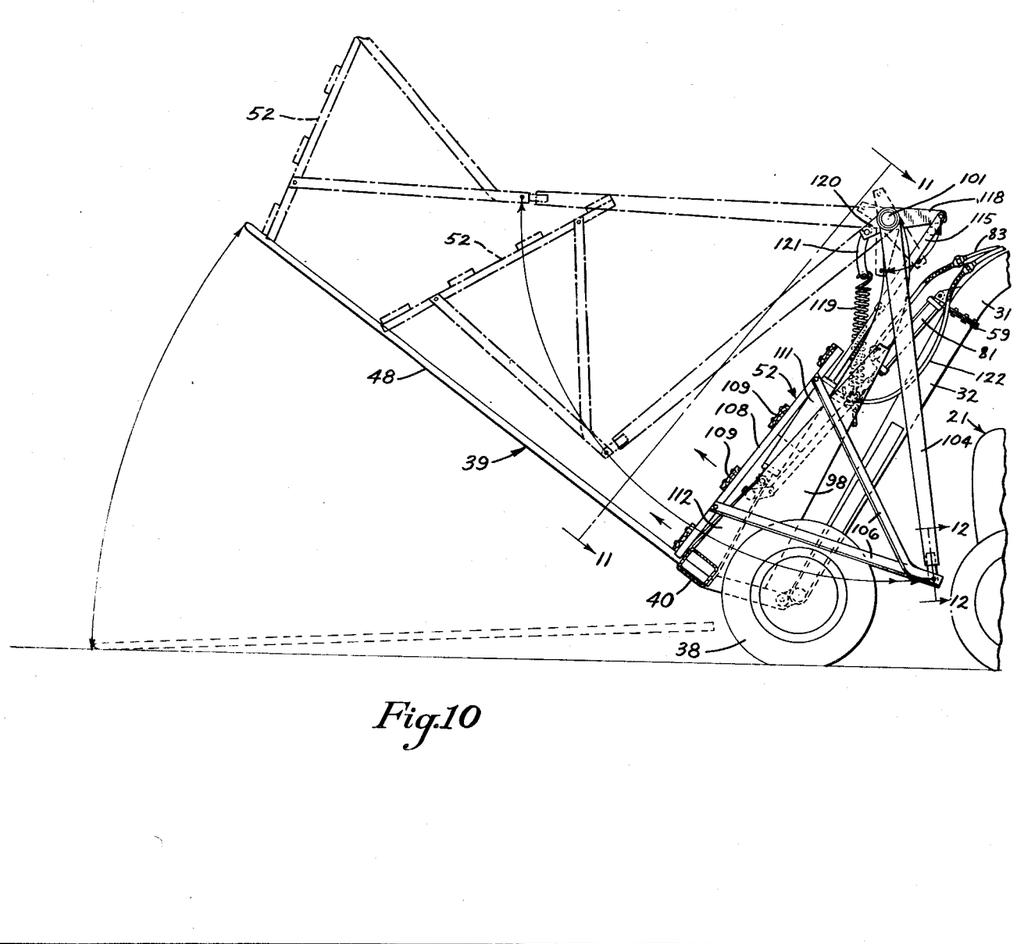
Fig. 10 is an off-center, fragmentary vertical sectional view of a buck rake embodying a modification of the invention, as viewed from the plane of line 10—10 in Fig. 11.
Figures 11, 12, 13:
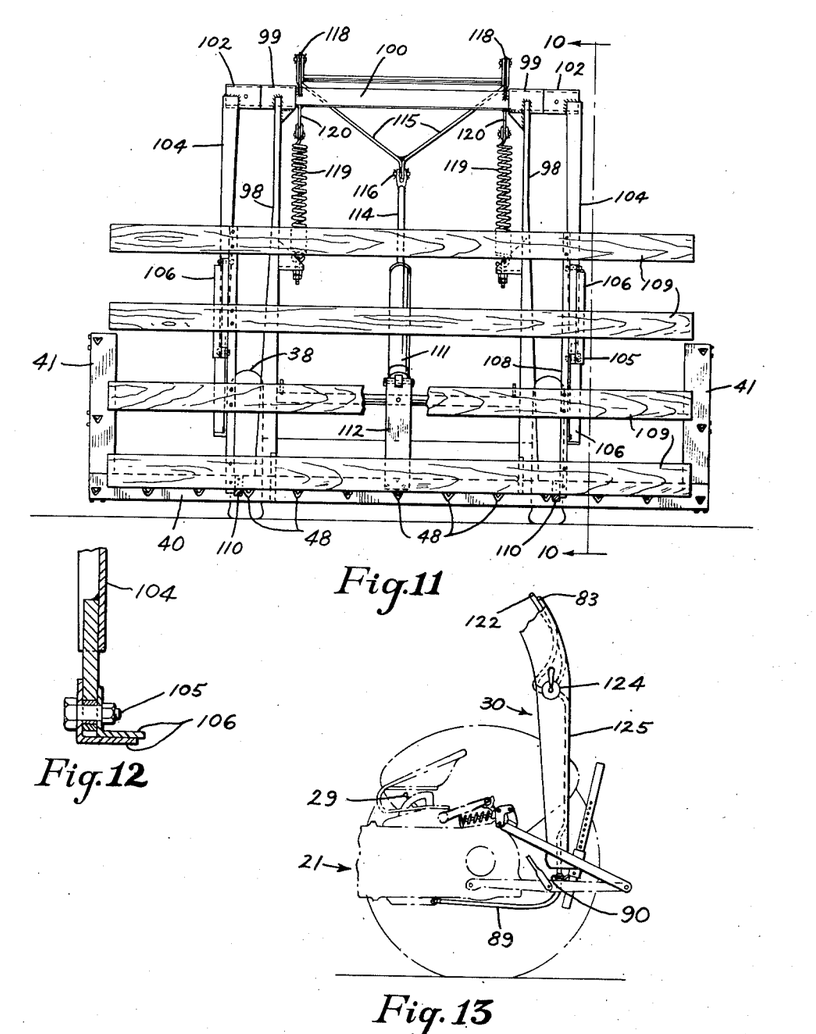
Fig. 11 is a fragmentary sectional view through the rake of Fig. 10 and taken in the plane of line 11—11.
Fig. 12 is an enlarged fragmentary sectional view through one of the pivotal connections between the crank arm and the actuating yoke of the rake back.
Fig. 13 is a fragmentary elevation of the coupled end of the implement as attached to the tractor hitch linkage and indicating the location of the selector valve for the modified implement of Fig. 10.

In Figs. 10 and 11, a modified form of buck rake is illustrated having power-actuated means for unloading the rake assembly. Accordingly, the rake beam 40 carries in lieu of braces 51 a pair of axially spaced upstanding supports 98, the upper ends of which may incline somewhat away from the main frame of the implement. Journaled in appropriate bearings 99 at the upper extremities of the supports 98 is a rockable sleeve 100 which may be stiffened by means of an enclosed concentric reinforcing shaft 101. The sleeve 100 is locked against axial displacement as by a pair of shorter sleeves 102 of slightly larger diameter and pinned or keyed thereto near its ends. Rigidly attached to and depending from the sleeves 98 are a pair of relatively long crank arms 104, terminating at their lower ends in pivotal connections 105 (shown in detail in Fig. 12) with two pairs of forwardly diverging arms 106. The latter are unitary with the structure of the rake back 52 which in this case comprises vertical structural members 108 and vertically spaced, transverse slats 109. With such an arrangement, clockwise rotation of the rockable sleeve 100 and the crank arms 104 will cause the rake back 52 to slide outwardly along the tines 48 (see Fig. 10), its path being guided laterally by means of rubbing blocks 110. As the angularity between the crank arms 104 and the arms 106 of the rake back approaches 180 degrees, the latter is shifted in attitude from inclination toward the implement frame to inclination in the opposite direction. This change facilitates the unloading operation.

For the purpose of shifting the rake back 52 between its retracted and extended positions, means is provided for applying a force to the sleeve 100 tending to rock the latter, such movement being transmitted to the rake back through the linkage described. Accordingly a second or auxiliarly hydraulic actuator 111 is associated with the rake assembly and is swingably attached at its lower end to an upstanding, centrally mounted bracket 112 located on the rake beam 40. It might be noted in passing that the rocking yoke 85 which is coupled to the actuator 81 is in this instance also connected to the bracket 112. Projecting from the upper end of the actuator 111 is a normally extended piston rod 114 having a bifurcated end which is rockably coupled to a yoke 115 as by pin 116. The arms of the yoke 115 are connected, in turn, to a pair of axially spaced crank arms 118 unitary with the rockable sleeve 100. On the side of the sleeve 100 opposite from the yoke 115 are a pair of biasing springs 119 which are coupled to spaced apart crank arms 120 by intermediate links 121, the arrangement of the springs being such as to oppose the torque produced by the actuator 111.

To operate the actuator 111, pressure fluid from the hydraulic system of the tractor is applied via a conduit 122 to the upper side of its piston, forcing the latter and the piston rod 114 to travel downwardly.

In order to avoid a complex construction in the hydraulic conduit connections adjacent the swivel coupling 61 selector means in the form of a two-way valve 124 (see Fig. 13) is mounted on the main frame 30 within easy reach of the operator and interposed in the conduits of the actuators. Thus pressure fluid is conducted upwardly from the swivel union 90 through a jumper conduit 125 which communicates with the valve 124. With such a connection, the operator can selectively apply pressure to or release pressure from either of the actuators independently of the other. In addition, it is also possible for him to selectively trap pressure within either actuator.

In operation, the rake back 52 is normally extended to assist in discharging hay when the rake assembly 39 is in the lower or raking position, at which time the process is aided by simultaneously backing the implement out from under the hay or like material being unloaded. However, if necessary the operator can utilize the valve 124 to trap pressure in the rake elevating actuator 81, and while holding the rake assembly in an elevated position can simultaneously apply pressure to the actuator 111 of the rake back. This feature may be used to good advantage in building up a hay stack.

I claim as my invention:

1. A ground-supported buck rake for use with a tractor having a vertically movable hitch linkage trailingly pivoted on its rear end portion and comprising, in combination, a main frame including a generally horizontal portion terminating in a pair of spaced apart depending legs defining an arch-like structure adapted to span the tractor longitudinally, ground wheels for supporting said buck rake at one end of said main frame, an attaching frame connected to the other end of said main frame and susceptible of detachable mounting between the tractor and the hitch linkage to restrain the latter against vertical movement and for detachably coupling said other end of said main frame to the rearward end portion of the tractor without limiting the free steering movement of the latter and with said rake in either a raking position ahead of the tractor or in a transport position rearward of the same, said attaching frame including a universal swivel coupling susceptible of 360 degree swivel movement for rendering said buck rake immediately reversible from one of said positions to the other by driving the tractor in a curved path through an arc of about 180 degrees, said universal swivel coupling being adapted to rock for accommodating pitching and lateral rolling movements of said buck rake throughout its 360 degree swivel movement.

2. A ground-supported buck rake adapted to be connected to the rearward end portion of a tractor and comprising, in combination, a main frame including a generally horizontal portion terminating in a pair of spaced apart depending legs defining an arch-like structure adapted to span the tractor longitudinally, ground-supporting means for said buck rake, and means including a ball and socket pivotal coupling for detachably connecting one of the legs of said main frame to the rearward end portion of the tractor with accommodation for pitch and lateral roll of said buck rake and with the same in either a raking position ahead of the tractor or in a transport position rearward of the tractor, said buck rake being susceptible of reversal from one of said positions to the other by driving the tractor either under or out from under said main frame.

3. In a ground-supported implement adapted for connection to the rearward end portion of a tractor, the combination comprising an arch-like main frame adapted to span the tractor longitudinally, ground-supporting means for one end of said main frame, and attaching means including a universal swivel for detachably coupling the other end of said main frame to the tractor without limiting the free steering movement of the latter and with said implement in either a working position ahead of the tractor or in a transport position rearward of the same, said attaching means also including a retractible ground support for said other end of said main frame.

4. In a ground-supported implement adapted for connection to the rearward end portion of a tractor having a vertically movable hitch linkage trailingly pivoted thereon, the combination comprising an arch-like main frame adapted to span the tractor longitudinally of the same, ground-supporting means for said implement at one end of said main frame, an attaching frame disposable between the tractor and the hitch linkage for constraining the latter against vertical movement and for detachably connecting said main frame to the tractor with said implement in a working position ahead of the tractor or a transport position rearward of the same or an intermediate angular position, and a ball and socket swivel coupling interposed between said attaching frame and the other end of said main frame, said swivel coupling being adapted to render said implement shiftable from one of said positions to the other by driving the tractor either under or out from under said main frame and to accommodate for pitch and lateral roll of said implement in any one of said positions.

5. In a ground-supported implement susceptible of attachment to the rearward end portion of a tractor, the combination comprising an arch-like main frame adapted to support an implement and dimensioned to span the tractor longitudinally, a ground support for one end of said main frame, and a universal swivel coupling for detachably connecting the other end of said main frame to the rear end portion of the tractor with said implement in a leading or a trailing or an intermediate angular position with respect to the tractor and with accommodation for pitch and lateral roll of said implement in any said position, said swivel coupling being adapted to permit the shifting of said implement from one of said positions to the other by the expedient of driving the tractor either under or out from under said main frame.

6. A ground-supported buck rake for attachment to the rearward end portion of a tractor and comprising, in combination, a main frame including a generally horizontal portion having downwardly curving ends which terminate in a pair of depending legs, the latter defining with said horizontal portion an arch-like structure, ground-supporting means for said buck rake adjacent one of the legs of said main frame, detachable pivotal coupling means for connecting the other of the legs of said main frame to the tractor with said buck rake in either a raking position ahead of the tractor or in a transport position rearward of the same, said buck rake being readily shiftable from one of said positions to the other, a rake assembly rockably mounted on said main frame in the vicinity of said ground-supporting means, said rake assembly being susceptible of fore and aft rocking movement between a lowered position and a raised position, and power transmitting means for applying rocking movement to said rake assembly.

7. A ground-supported buck rake for attachment to a tractor having a hydraulic power lift including a control therefor and comprising, in combination, a main frame of substantially the shape of an inverted U and including a generally horizontal portion having downwardly curving ends which terminate in a pair of depending legs, a transverse frame member adjacent one of the legs of said main frame, ground wheels journaled on said transverse frame member for supporting said buck rake, attaching means including a 360 degree swivel coupling for detachably connecting the other of the legs of said main frame to the tractor with said buck rake in either a leading or a trailing condition with respect to the former and selectively shiftable therebetween, a rake assembly mounted on said transverse frame member for fore and aft rocking movement between a lowered position and a raised position, and a hydraulic actuator operatively connected between said main frame and said rake assembly for applying rocking movement to the latter, said actuator being susceptible of control by the power lift on the tractor.

8. A ground-supported buck rake for attachment to a tractor having a hydraulic power lift including a control therefor and comprising the combination of a main frame fashioned substantially in the shape of an inverted U with a pair of longitudinally spaced depending legs, a transverse frame member rigidly mounted on one of said legs adjacent the lower extremity thereof, ground wheels journaled on axles carried by said transverse frame member, attaching means including a pivotal coupling rotatable through at least 360 degrees for detachably connecting the other of said legs to the tractor with said buck rake readily reversible between leading and trailing positions with respect to said tractor, a rake assembly mounted on said transverse frame member for fore and aft rocking movement and having longitudinally extending rake tines and a pivotally supported transverse rake back, a hydraulic actuator operatively connected between said main frame and said rake assembly for selectively rocking the latter between a lowered position and a raised position, said actuator being responsive to the power lift control on said tractor, and ground-engaging feet dependably carried by said rake back, said feet being adapted when said rake assembly is in the lowered position and said buck rake is being backed in a direction away from the former to bite into the ground and swing said rake back longitudinally of said rake tines.

9. A ground-supported buck rake for attachment to the rearward end portion of a tractor and comprising the combination of an arch-like main frame including a generally horizontal portion having downwardly curving ends which terminate in a pair of longitudinally spaced depending legs, a transverse frame member mounted on one of said legs adjacent the lower extremity thereof, ground-supporting means for said buck rake associated with said transverse frame member, attaching means including a swivel coupling rotatable through at least 360 degrees for detachably connecting the other of said legs to the tractor, a rake assembly mounted on said transverse frame member for fore and aft rocking movement and having longitudinally extending rake tines for gathering hay or like material and a transverse rake back slidable with respect to the latter, power transmitting means for applying rocking movement to said rake assembly, and additional power transmitting means for sliding said rake back longitudinally of said tines in order to strip hay or like material therefrom.

10. A reversible buck rake for attachment to the rearward end portion of a tractor having a hydraulic power lift including a control therefor and comprising, in combination, an arch-like main frame having a pair of longitudinally spaced depending legs, a transverse frame member mounted on one of said legs adjacent the lower extremity thereof, ground wheels journaled on axles carried by said transverse frame member, an attaching frame including a pivotal coupling rotatable through at least 360 degrees for detachably connecting the other of said legs to the tractor, a rake assembly pivotally mounted on said transverse frame member for fore and aft rocking movement and having longitudinally extending rake tines for gathering hay or like material and a transverse rake back slidable with respect to said tines, power transmitting means for rocking said rake assembly between a working position close to the ground and a raised carrying position, and a hydraulic actuator carried by said rake assembly for sliding said rake back longitudinally of said tines in order to strip hay or like material therefrom, said actuator being responsive to the power lift control on said tractor and operable independently of the angular position of said rake assembly.

11. A reversible buck rake for use with a tractor having a hydraulic power lift including a control therefor and comprising, in combination, a main frame shaped substantially in the form of an inverted U and including a pair of longitudinally spaced depending legs, a transverse frame member rigidly secured to one of said legs at the lower end thereof, axles carried by said transverse frame member, ground wheels journaled on said axles, an attaching frame including a 360 degree swivel coupling for detachably connecting the other of said legs to said tractor, a rake assembly pivotally mounted on said transverse frame member for fore and aft rocking movement and having longitudinally extending rake tines for gathering hay or similar material and a transverse back member slidable with respect to said tines, a hydraulic actuator operatively connected between said main frame and said rake assembly for rocking the latter between a working position close to the ground and a raised carrying position, and a second hydraulic actuator carried by said rake assembly for sliding said back member longitudinally of said tines in order to strip hay or similar material therefrom, both of said actuators being responsive to the power lift control on the tractor.

12. In a reversible buck rake of the character set forth and for use with a tractor having a hydraulic power lift including a manual control therefor and means for supplying pressure fluid thereto, the combination of a main frame, a transverse frame member rigidly secured to said main frame, ground supporting means associated with said transverse frame member, swivel hitch means for coupling said buck rake to the tractor, a rake assembly pivotally mounted for fore and aft rocking movement on said transverse frame member and having longitudinally extending tines and a transverse rake back slidable with respect thereto, a hydraulic actuator connected between said main frame and said rake assembly for rocking the latter between a working position close to the ground and a raised carrying position, a second hydraulic actuator carried by said rake assembly for sliding said rake back longitudinally of said tines, a hydraulic conduit on said main frame for conducting pressure fluid from said fluid supplying means on the tractor in accordance with the manual setting of said power lift control, and valve means for selectively dispatching pressure fluid from said hydraulic conduit to either of said hydraulic actuators independently of the other.

13. In a reversible buck rake of the character set forth and for use with a tractor having a hydraulic power lift including a manual control therefor and means for supplying pressure fluid thereto, the combination of a main frame, means including a swivel coupling rotatable about an upright axis through at least 360 degrees for detachably connecting said main frame to the tractor, said swivel coupling having an axial bore therethrough, a rake assembly pivotally mounted for fore and aft rocking movement with respect to said main frame and having longitudinally extending tines and a slidable rake back, a hydraulic actuator connected between said main frame and said rake assembly for rocking the latter between a working position close to the ground and a raised carrying position, a second hydraulic actuator carried by said rake assembly for sliding said rake back longitudinally of said tines, a hydraulic conduit mounted on the tractor and communicating with said pressure fluid supplying means, a hydraulic swivel union disposed in axial alinement with said rotatable swivel coupling, a conduit on said main frame adapted to communicate with said conduit on the tractor via the axial bore in said swivel coupling and also via said swivel union, the supply of pressure fluid to said conduit on said main frame being governed by the manual power lift control on the tractor, and a selector valve on said main frame for dispatching pressure fluid alternatively from said conduit on the latter to either of said actuators, said valve being located within reach of an operator in driving position on the tractor.

14. In a reversible buck rake of the character set forth for use with a tractor having a hydraulic power lift including a manual control therefor, the combination comprising a main frame shaped substantially in the form of an inverted U and including a pair of depending legs, a transverse frame member rigidly secured to one of said legs, ground-supporting means associated with said transverse frame member, an attaching frame, a swivel coupling carried by said attaching frame and rotatable through at least 360 degrees for detachably connecting the other of said legs to said tractor, a rake assembly mounted on said transverse frame member for fore and aft rocking movement between a lowered position and a raised position, a hydraulic actuator operatively connected between said main frame and said rake assembly for applying a rocking movement to the latter, said actuator being responsive to the manual control of the power lift on the tractor, and visual indicating means for apprising an operator in driving position on the tractor of the fact that said rake assembly has reached the raised position.

15. In a reversible buck rake of the character set forth for use with a tractor having a hydraulic power lift including a manual control therefor and carrying a hitch linkage in trailing relation to the rearward end portion thereof, the combination comprising a main frame shaped substantially in the form of an inverted U, an attaching frame for positively precluding the raising of the hitch linkage by said tractor power lift, a pivotal coupling carried by said attaching frame and rotatable through at least 360 degrees for detachably connecting said main frame to said hitch linkage, a rake assembly associated with said main frame and mounted for fore and aft rocking movement between a lowered position and a raised position, a hydraulic actuator having a piston rod slidably disposed within a cylinder body for relative movement with respect thereto and for applying rocking movement to said rake assembly, said actuator being operatively connected between said main frame and said rake assembly and responsive to the manual control of the power lift on the tractor, and normally inconspicuous visual indicating means operable when said rake assembly reaches the raised position and as an incident to the relative motion between said piston rod and said cylinder body for apprising an operator in driving position on the tractor of the fact that said piston rod has reached the end of its stroke.

16. In a reversible buck rake for use with a tractor having a hitch linkage trailingly supported on the rear end portion thereof, the combination comprising an arch-like main frame of box girder construction and having a pair of longitudinally spaced depending legs, a transverse frame member rigidly connected with one of said legs adjacent the lower extremity thereof, ground supporting means associated with said transverse member, a rake beam arranged substantially parallel to said transverse frame member and mounted for fore and aft rocking movement thereon by means of a pair of laterally spaced, longitudinally extending arms, a plurality of longitudinally extending rake tines carried by said rake beam, upstanding side beams mounted on said rake beam adjacent the ends thereof, side arms carried by said beams and extending in a longitudinal direction therefrom, a pair of spaced apart vertical braces rigidly secured to said rake beam intermediate its ends, and a swingable rake back dependably supported from pivot points near the tops of said vertical braces.

17. In a reversible buck rake adapted for detachable connection to the rearward end portion of a tractor, the combination comprising an arch-like main frame of sufficient height and length to permit the tractor with its operator in driving position thereon to pass freely thereunder when said buck rake is connected to said tractor, a transverse frame member located adjacent one end of said main frame and rigidly attached thereto, ground wheels associated with said transverse frame member, a rake assembly rockably mounted on said transverse frame member, actuating means for tilting said rake assembly vertically, coupling means including a swivel having free movement through at least 360 degrees for connecting to said tractor the opposite end of said main frame, and retractible ground engaging means attached to said coupling means for supporting said opposite end of said frame when said buck rake is unhitched from the tractor.

18. In an implement of the character set forth and for use with a tractor having a hydraulic power lift and conduit means for tapping pressure fluid therefrom, the combination of a swivel coupling for detachably connecting said implement to the tractor, said coupling having an axial bore therethrough, a hydraulic conduit on said implement and having a portion housed within the bore of said coupling, and a hydraulic swivel union in axial alinement with said swivel coupling for connecting said conduit on said implement with the conduit means on said tractor while permitting free swivel movement between said implement and said tractor.

CLARENCE B. RICHEY.

REFERENCES CITED

The following references are of record in the file of this patent:

UNITED STATES PATENTS

| Number | Name | Date |
|---|---|---|
| 1,379,399 | Ferguson | May 24, 1921 |
| 2,218,579 | Jones et al. | Oct. 22, 1940 |
| 2,304,421 | Rogers | Dec. 8, 1942 |
| 2,346,330 | Ratcliff | Apr. 11, 1944 |
| 2,349,352 | Johnson | May 23, 1944 |
| 2,349,353 | Johnson | May 23, 1944 |
| 2,436,475 | Jones et al. | Feb. 24, 1948 |
| 2,451,589 | Thomas | Oct. 19, 1948 |